United States Patent [19]
Stevens

[11] Patent Number: 5,321,742
[45] Date of Patent: Jun. 14, 1994

[54] ENTRY DOOR ANSWERING TELEPHONE SYSTEM

[76] Inventor: Clarke J. Stevens, 6705 Underwood Ave., Omaha, Nebr. 68132

[21] Appl. No.: 910,823

[22] Filed: Jul. 6, 1992

[51] Int. Cl.$^5$ .......................................... H04M 11/00
[52] U.S. Cl. .................................................... 379/103
[58] Field of Search ............... 379/103, 104, 105, 102, 379/200, 199, 354, 355, 356

[56] References Cited

U.S. PATENT DOCUMENTS

| | | | |
|---|---|---|---|
| 3,665,116 | 5/1972 | Holstrom | 379/103 |
| 3,708,629 | 1/1973 | First | 379/103 |
| 3,728,493 | 4/1973 | Ter Veen | 379/103 |
| 3,732,372 | 5/1973 | Tramontano | 379/103 |
| 3,917,911 | 11/1975 | Lesher | 379/103 |
| 3,947,641 | 3/1976 | Trell | 379/103 |
| 4,113,986 | 9/1978 | Clement et al. | 379/103 |
| 4,172,967 | 10/1979 | Porter et al. | 379/103 |
| 4,658,095 | 4/1987 | Santiago | 379/103 |
| 4,872,194 | 10/1989 | Trell | 379/103 |
| 4,987,589 | 1/1991 | Trell | 379/103 |

*Primary Examiner*—Wing F. Chan
*Attorney, Agent, or Firm*—John A. Beehner

[57] ABSTRACT

An entry door telephone system having a touch-tone telephone with a keypad and an incoming phone line connected to the telephone. A door speaker phone is switchably connected in parallel with the touch-tone telephone, and a paging module is switchably connected in series with the door speaker phone for completing a circuit between the touch-tone telephone and the door speaker phone in response to a data signal transmitted from the keypad of the touch-tone telephone. For controlling operation of this system, a control box is connected to the paging module, the door speaker phone and the touch-tone telephone such that the circuit between the touch-tone telephone and the door speaker phone is broken in response to a data signal transmitted by the touch-tone telephone. Finally, a power source is connected to the paging module and the control box for supplying power thereto.

9 Claims, 1 Drawing Sheet

ENTRY DOOR ANSWERING TELEPHONE SYSTEM

BACKGROUND OF THE INVENTION

1. Technical Field

This invention relates to an entry door answering telephone system and, more particularly, to an entry door answering telephone system having a door speaker phone switchably connected to a touch-tone telephone through a paging module and a control box, thus enabling a resident to use the touch-tone telephone already used to receiving incoming phone calls to communicate with the door speaker phone.

2. Description of the Prior Art

An increasingly popular method of home protection relates to communication systems used to converse with persons attempting to gain entrance to a residence before unlocking the door and letting such persons in. Such communication systems, however, require installing one communication unit outside near the entrance to the residence and another inside the residence in a location where the resident may freely use the communication unit. To use the communication system, therefore, the resident must go to the location of the inside communication unit and use the unit there. This may present a problem for persons most in need of a communication system, namely the elderly or infirm. There is therefore a need for a door answering system which may be used from more than one location within a residence and which does not require new wiring to those locations.

Furthermore, as the communication system above described requires two separate units, both must be purchased, resulting in added expense for the consumer. There is therefore a need for a door answering system which may require purchase of only one communication unit and may use communication devices already present in a typical residence.

Therefore, an object of the present invention is to provide an improved entry door answering telephone system.

Another object of the present invention is to provide an entry door answer telephone system which uses a standard touch-tone telephone connected to a door speaker phone for communication with persons outside the residence.

Still another object of the present invention is to provide an entry door answering telephone system which may be accessed from any touch-tone telephone in the residence which is connected on the same telephone line.

Finally, an object of the present invention is to provide an entry door answering telephone system which is relatively simple and inexpensive to manufacture and safe and durable in use.

SUMMARY OF THE INVENTION

The present invention provides an entry door answering telephone system consisting of a touch-tone telephone which is connected to an incoming telephone line. The touch tone telephone has a standard alphanumeric keypad. Switchably connected in parallel with the touch-tone telephone is a door speaker phone. Switchably connected in series with the door speaker phone is a paging module which, when activated, will complete a circuit between the touch-tone telephone and the door speaker phone. The paging module is activated in response to a data signal transmitted from the keypad of the touch-tone telephone. Connected to the paging module, the door speaker phone and the touch-tone telephone is a control box which, in response to a data signal transmitted by the touch-tone telephone, will disconnect the circuit between the touch-tone telephone and the door speaker phone. Finally, a power source for supplying power to the paging module and the control box is provided.

The present invention, by utilizing a touch-tone telephone as one element of the entry door answer telephone system, enables a user of the system to reduce the initial expenditures required to install the entry door answering telephone system as compared to systems found in the prior art. Furthermore, as the system of the present invention uses only one customized element, i.e., the control box, this system may be seen as commercially producible at this time. The present invention thus provides a substantial improvement over other such systems in the prior art.

DESCRIPTION OF THE PREFERRED EMBODIMENT

Figure 1:
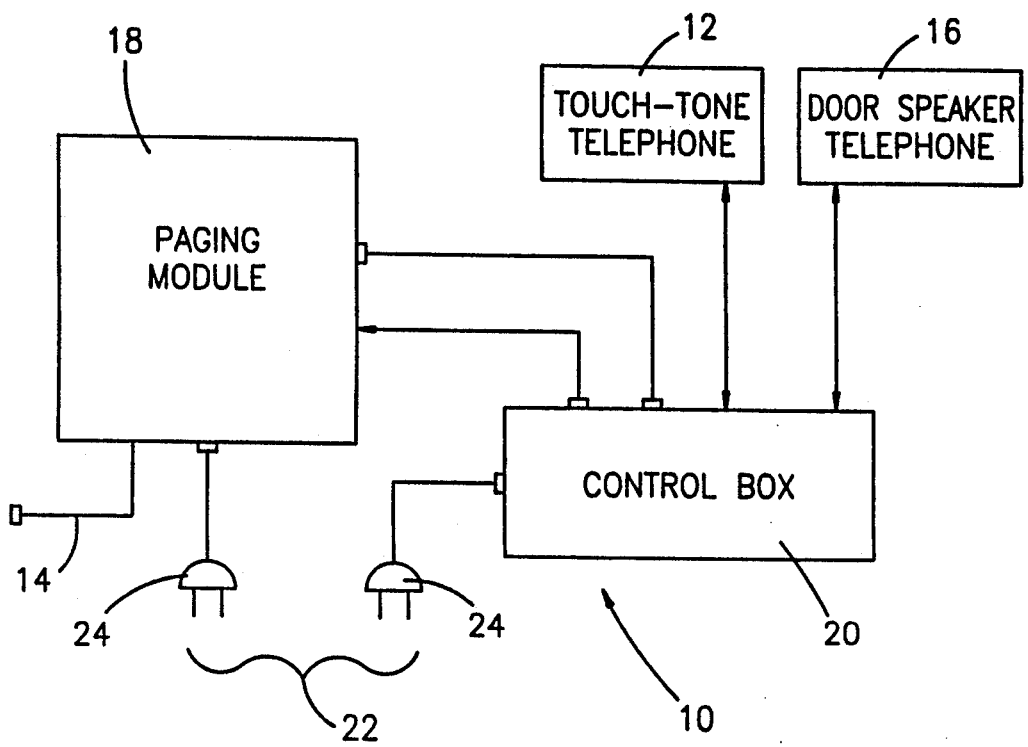
FIG. 1 is a block diagram of the entry door answering telephone system of the present invention exhibiting the various elements of the system.
Figure 2:
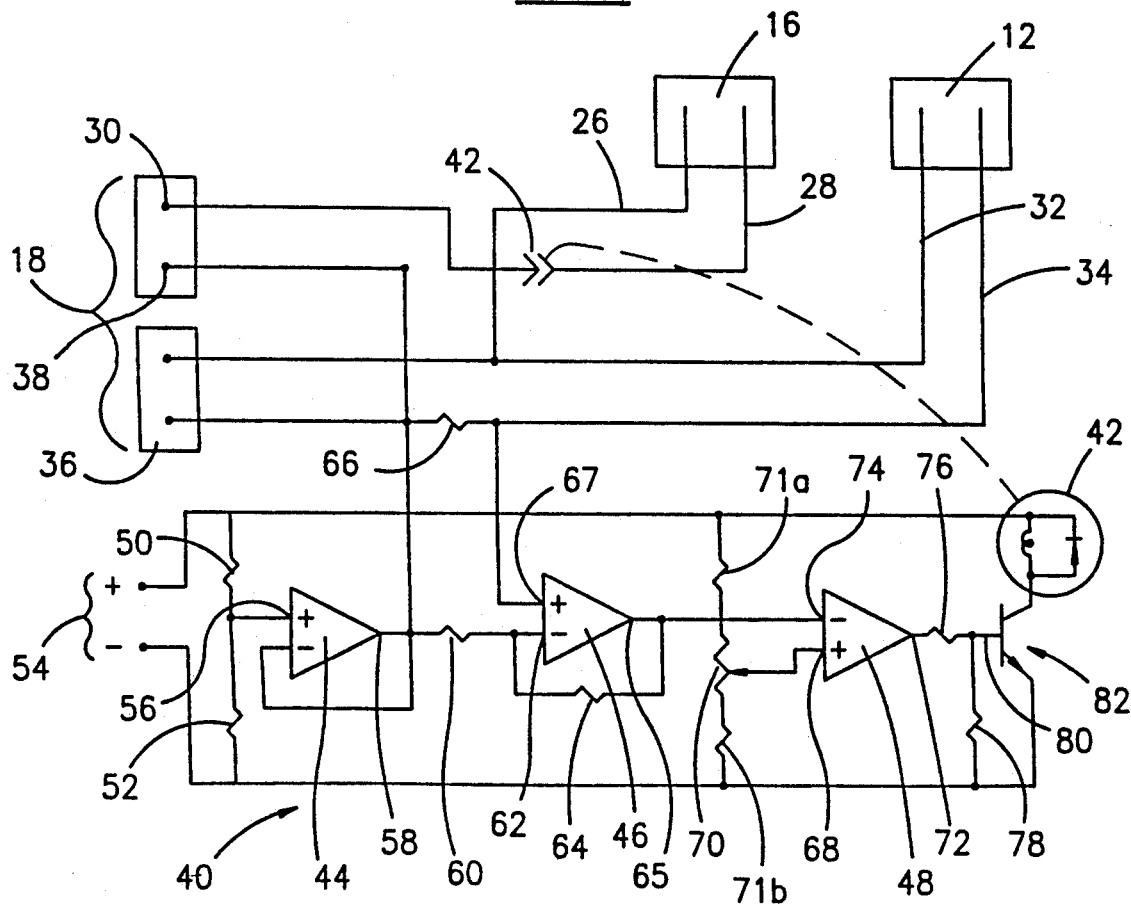
FIG. 2 is a schematic circuit diagram of the present invention showing the preferred wiring connections among the elements therein.

The entry door answering telephone system 10 is shown in its preferred embodiment in FIGS. 1 and 2 as including a touch-tone telephone 12 which is connected to an incoming phone line 14. Preferably mounted adjacent an entrance to the residence is a door speaker phone 16, preferably positioned such that a person wishing to announce their presence at the entrance to the dwelling may conveniently do so. The touch-tone telephone 12 and the door speaker phone 16 are preferably switchably connected in parallel with each other. Specifically, the door speaker phone 16 has two wires extending out therefrom, a red door phone wire 26 and a green door phone wire 28. As shown in the wiring diagram, FIG. 2, the green door phone wire 28 is switchably attached to the paging module 18 at the normally open relay contact 30 of the paging module 18.

It is to be understood that the present invention is intended for use solely with touch-tone telephones and is not for use with rotary-dial telephones. Additionally, it is clear that a person wishing to announce their presence at the entrance to the dwelling would either knock on the door or ring the doorbell, two standard and well-known ways to do so.

The touch-tone telephone 12 also has two wires extending outward therefrom, a red telephone wire 32 and a green telephone wire 34. The red telephone wire preferably extends to the paging module phone plug 36 which in turn is connected to the incoming phone line 14. The red door phone wire 26 is preferably spliced into the red telephone wire 32 at a point between the touch-tone telephone 12 itself and the paging module phone plug 36.

The normally closed paging module relay contact 38 is preferably spliced into the green telephone wire 34 at a point between the touch-tone telephone 12 and the paging module phone plug 36. Therefore, when the normally open paging module relay contact 30 is closed, a circuit is formed between the touch-tone telephone 12 and the door speaker phone 16 allowing data transfer in the form of voltage pulses between the touch-tone telephone 12 and the door speaker phone 16.

The purpose of the control box 20 is to disconnect the door speaker phone 16 from the circuit between the touch-tone telephone 12 and the door speaker phone 16 when the touch-tone telephone 12 is returned to the "on-hook" position at the completion of the conversation. This is necessary because the door speaker phone 16 is connected in parallel with the touch-tone telephone 12 during the conversation. The paging module 18 contains "hang up" circuitry which requires that the dc load in the circuit on which the touch-tone telephone 12 is returns to zero. Since the door speaker phone 16 is still connected, a control circuit 40 is used to sense when the touch-tone telephone 12 is returned to the "on-hook" position. The control circuit 40 then disconnects the door speaker phone 16 from the circuit. A power source 22 is provided to supply power to the control circuit 40 and the paging module 18 in a preferred embodiment. Transformers 24 may also be provided to convert the alternating current to direct current, although this is not critical to the invention.

A control box relay 42 is connected in series on the green door phone wire 28, such that when the relay 42 is open, no current may flow through the green door phone wire 28. The control box relay 42 is an element of the control box circuit 40 elements of which are described below. The control circuit 40 preferably contains three op-amps 44, 46 and 48, which are preferably ¼ of 324 Op Amps and which function as follows.

Two 20 K Ω resistors 50 and 52 are used to establish a potential midway between the terminal potentials on the twelve-volt power supply 54 for the control circuit 40. This potential, called the reference voltage level, is connected to pin 56 on the first op-amp 44. This first op-amp 44 is connected as a unity-gain follower which establishes the reference potential on pin 58, the output pin on the first op-amp 44.

The second op-amp 46 is connected as a noninverting amplifier with a gain of +21. The gain is established by the 1 K Ω resistor 60 between pin 58 on the first op-amp 44 and pin 62 on the second op-amp 46, and the 20 K Ω resistor 64 between output pin 66 and pin 62 on the second op-amp 46. The input signal to the second op-amp 46 is the voltage across the 46 Ω resistor 66 which is connected in series with the green telephone wire 34, and is fed to pin 67.

The third op-amp 48 is connected as an inverting-type comparator with an adjustable voltage on pin 68. The adjustable voltage is provided by an adjustable 10 K Ω resistor 70. The output voltage of the third op-amp 48 on pin 72 is negative with respect to the pin 58 reference when the potential on pin 72, an input pin to the third op-amp 48, is above the adjustable voltage on pin 70. The output on pin 72 is positive with respect to the pin 58 reference when pin 74 potential is below the adjustable voltage on pin 68.

The 5 K Ω resistor 76 and 1 K Ω resistor 78 attached to the base 80 of the npn transistor 82 cause the transistor 82 to be "off" when pin 72 on the third op-amp 48 is low and "on" when pin 72 on the third op-amp 48 is high. This causes the control box relay 42 to be "open" when pin 72 on the third op-amp 48 is low and "closed" when pin 72 on the third op-amp 48 is high.

In operation, the control circuit 40 functions as follows. When the touch-tone telephone 12 is "on hook," there is no current in the 46 Ω resistor 66 so the input voltage to the second op-amp 46 on pin 67 is zero with respect to the reference voltage on pin 58 of the first op-amp 44. The adjustable voltage on pin 68 of the third op-amp 48 is set so the voltage on pin 72 of the third op-amp 48 is low and the control box relay 42 is open with the touch-tone telephone 12 "on hook." When the touch-tone telephone 12 is taken "off hook," a direct current exists in the 46 Ω resistor 66 and pin 67 on the second op-amp 46 is negative with respect to the pin 58 reference. This causes pin 74 on the third op-amp 48 to go negative and pin 72 on the third op-amp 48 to go positive. This action turns the transistor 82 "on" and closes the control box relay 42. The door speaker phone 16 is ready to operate when the normally open paging module relay contact 30 is closed by a "*" tone received from the touch-tone telephone 12. In the absence of a "*" tone, the touch-tone telephone works normally with the incoming phone line 14 and the door speaker phone 16 remains inactive because the normally open paging module relay contact 30 is "open."

When the touch-tone telephone 12 is returned "on hook," the direct current in the 46 Ω resistor 66 returns to zero. This causes the transistor 82 to turn "off" and the control box relay 42 opens. The door speaker phone 16 is thus disabled and the system is in the normal state waiting for an incoming call or waiting for the touch-tone telephone 12 to be taken "off-hook."

In one preferred embodiment, the paging module 18 would be a Radio Shack Paging Module, catalog number 43-183, the touch-tone telephone 12 would be any touch-tone phone such as an AT&T Trimline 210 and the door speaker phone 16 would be a Radio Shack Duophone 102, catalog number 43-278. However, it is to be understood that there are numerous manufacturers of the three above-mentioned elements, the majority of which may be acceptable for use in the present invention.

It is to be understood that a standard paging module functions to close its relay contact 38 in response to transmission of a "*" signal from the touch-tone telephone. However, many paging modules may be switched to operate to close their relay contact 38 upon transmission of a "#" signal. Therefore, the above description of a preferred embodiment may also be used in connection with transmission of a "#" signal.

Additionally, instead of a manually activated door speaker phone, a voice-activated door speaker phone having a voice-actuated switch mechanism may be provided, although such a substitution would only affect how the speaker phone is activated, and would not affect the functioning of the present invention.

It can be seen from the above descriptions that the present invention provides a substantial improvement over the prior art. The present invention uses a standard touch-tone telephone as an element of the communication system, thus resulting in savings for a consumer who wishes to use the system of the present invention. Furthermore, as the present invention only contains one specially designed element, the control circuit, the present invention provides a substantial increase in simplicity over examples found in the prior art.

There has thus been shown and described an invention which accomplishes at least all of the stated objectives.

I claim:

1. An entry door answering telephone system for a location equipped with a touch-tone telephone having a keypad and an incoming phone line connected to said telephone, said system comprising;
   a door speaker phone;
   means for switchably connecting said door speaker phone in parallel with said touch-tone telephone;
   a paging module;
   means for switchably connecting said paging module with said door speaker phone and said touch-tone telephone for completing a circuit between said touch-tone telephone and said door speaker phone in response to a data signal transmitted by said touch-tone telephone;
   a control box;
   means for connecting said control box to said paging module, said door speaker phone and said touch-tone telephone such that said circuit between said touch-tone telephone and said door speaker phone is broken in response to a data signal transmitted by said touch-tone telephone;
   means for connecting said paging module and said control box to a source of electric power; and
   said control box being operative to disconnect said circuit between said touch-tone telephone and said door speaker phone and to reconnect said incoming phone line and said touch-tone telephone in response to said touch-tone telephone returning to an "on-hook" position and thus returning the touch tone telephone's direct current load to zero (0).

2. The entry door answering telephone system of claim 1 wherein said keypad of said touch-tone telephone includes a "*" key and a "#" key.

3. The entry door answering telephone system of claim 2 wherein said circuit between said touch-tone telephone and said door speaker phone is completed by said paging module in response to engaging said "*" key on said keypad of said touch-tone telephone.

4. The entry door answering telephone system of claim 3 wherein said circuit between said touch-tone telephone and said door speaker phone is completed by said paging module in response to engaging said "#" key on said keypad of said touch-tone telephone.

5. The entry door answering telephone system of claim 1 wherein said paging module further comprises a relay contact having open and closed positions, said control box further comprises a relay contact having open and closed positions and said relay contact of said paging module is connected in series with said relay contact of said control box whereby voltage pulses may not proceed unless both of said relay contacts are in closed position.

6. The entry door answering telephone system of claim 5 wherein said relay contact of said paging module is closed in response to said "*" key or said "#" key being engaged, and is opened in response to said touch-tone telephone being returned to "on-hook" causing said direct current load of said touch-tone telephone to return to zero (0).

7. The entry door answering telephone system of claim 6 wherein said relay contact of said control box is closed in response to said "*" key or said "#" key being engaged, and is opened upon said touch-tone telephone receiving current from said incoming phone line as the direct current changes direction in said connection between said incoming phone line and said touch-tone telephone when said incoming phone line is disconnected by said paging module.

8. The entry door answering telephone system of claim 1 wherein said door speaker phone further comprises a voice actuated switch mechanism for activating said door speaker phone and transmitting signals to said touch-tone telephone upon said circuit between said door speaker phone and said touch tone phone being completed.

9. An entry door answering telephone system comprising;
   a touch-tone telephone having a keypad;
   an incoming phone line connected to said telephone;
   a door speaker phone switchably connected in parallel with said touch-tone telephone;
   a paging module switchably connected with said door speaker phone and said touch-tone telephone for completing a circuit between said touch-tone telephone and said door speaker phone in response to a data signal transmitted from said keypad of said touch-tone telephone;
   a control box connected to said paging module, said door speaker phone and said touch-tone telephone such that said circuit between said touch-tone telephone and said door speaker phone is broken in response to a data signal transmitted by said touch-tone telephone;
   means for connecting said paging module and said control box to a source of electric power; and
   said control box being operative to disconnect said circuit between said touch-tone telephone and said door speaker phone and to reconnect said incoming phone line and said touch-tone telephone in response to said touch-tone telephone returning to an "on-hook" position and thus returning the touch-tone telephone's direct current load to zero (0).

* * * * *